Sept. 19, 1939.  J. P. BURNS  2,173,407
SLOPE FINISHER ATTACHMENT FOR ROAD MACHINES
Filed Sept. 8, 1937  3 Sheets-Sheet 3
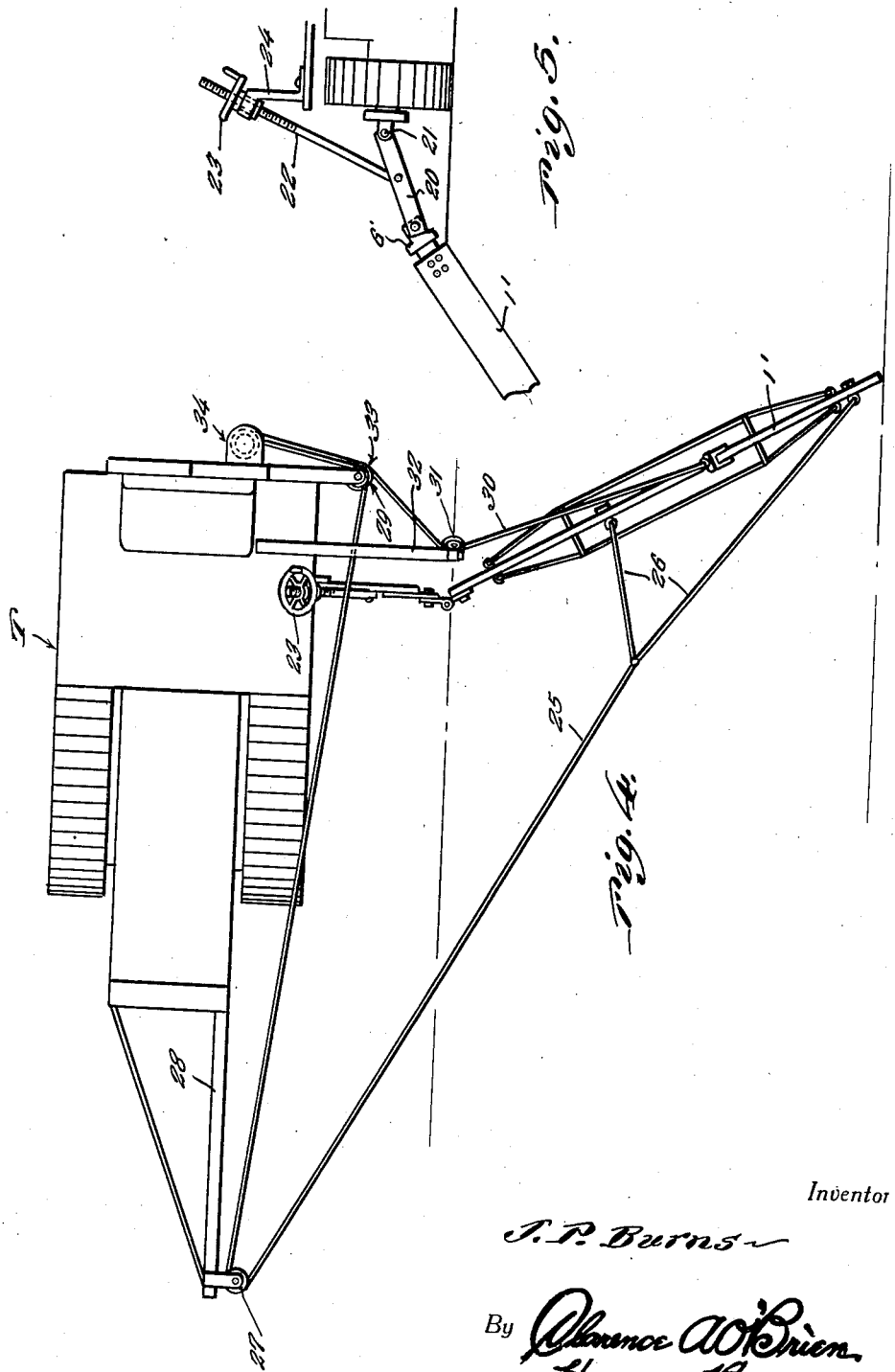

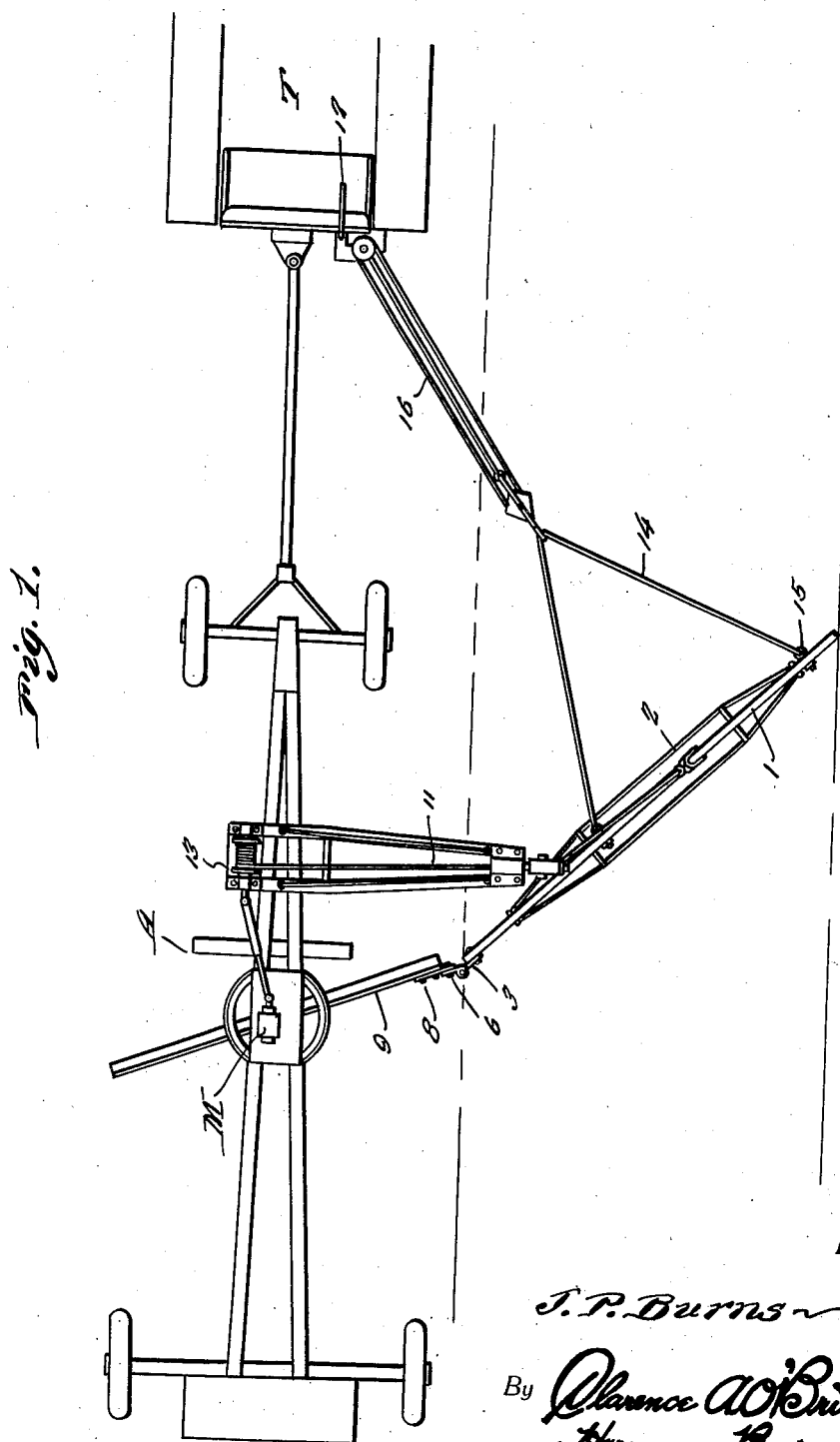

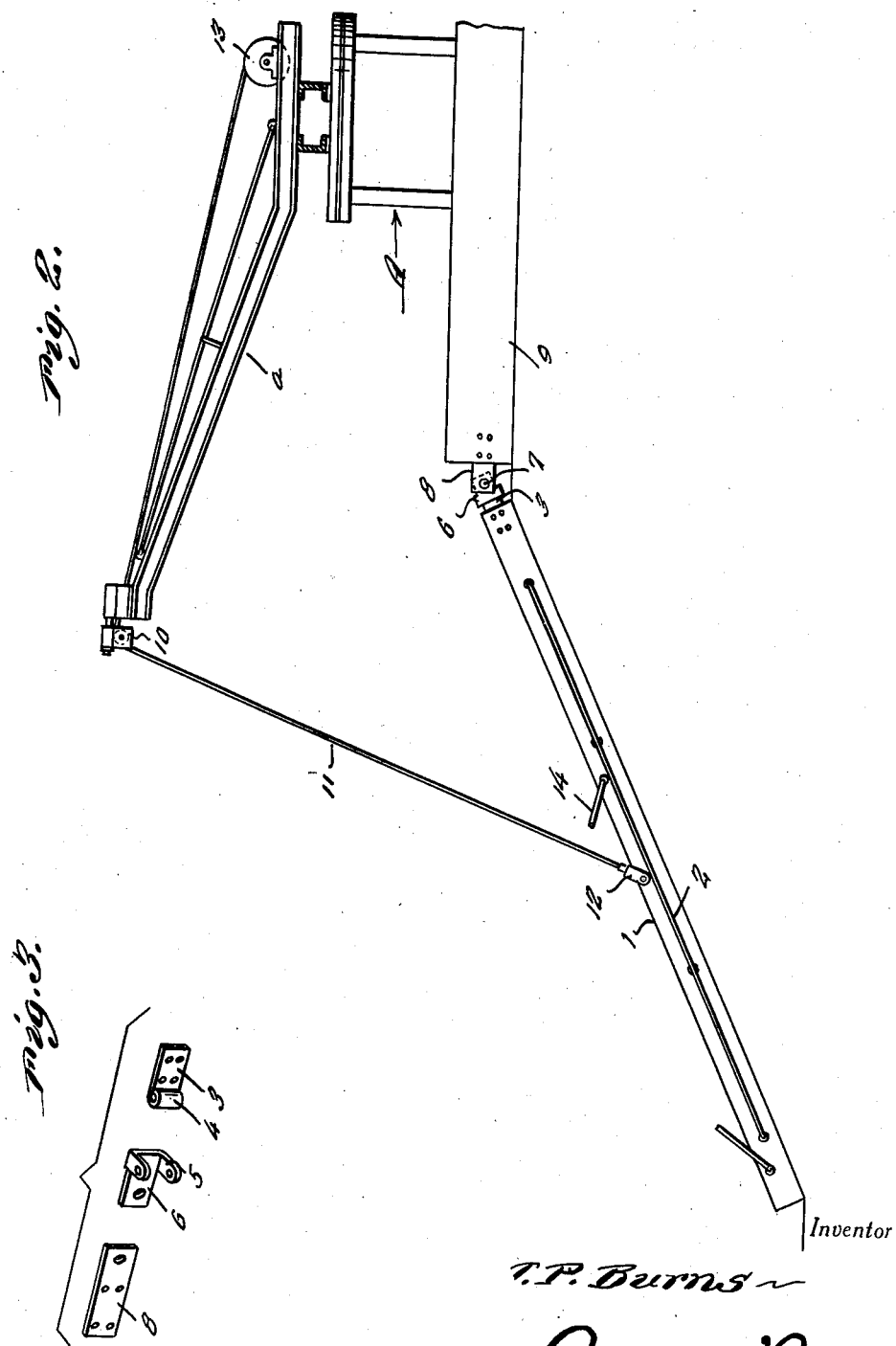

Patented Sept. 19, 1939

2,173,407

UNITED STATES PATENT OFFICE 2,173,407

SLOPE FINISHER ATTACHMENT FOR ROAD MACHINES

James P. Burns, Nashville, Tenn.

Application September 8, 1937, Serial No. 162,931

1 Claim. (Cl. 37—155)

This invention relates to an attachment for a road machine, the general object of the invention being to provide a long blade connected to the outer end of the main blade of the machine by universal joint, with means for raising and lowering the long blade and for swinging it forwardly and rearwardly so as to cause it to properly slope or level the material at a side of the road.

The invention also contemplates the use of the parts thereof on a tractor where it is not desired to use the road machine.

This invention also consists in certain other features of construction and in the combination and arrangement of several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a plan view showing the invention in use with a road machine and a tractor.

Figure 2 is an end view of part of the road machine with the invention applied thereto.

Figure 3 is a view of the parts used for connecting the long blade to the outer end of the road machine blade.

Figure 4 is a plan view showing the invention applied to a tractor.

Figure 5 is a fragmentary end view of the tractor showing how the long blade is adjustably connected to a side part of the tractor.

In carrying out my invention I provide a long blade 1 which is reinforced by the longitudinally extending trusses 2. A hinge leaf 3 is connected to one end of the blade, this leaf having a barrel 4 which fits between the ears 5 of a leaf 6, a hinge pin passing through the perforations in the ears and through the barrel 4 to hingedly connect the leaf 6 to the blade. This leaf 6 is connected by a pivot pin 7 to the projecting end of a plate 8 which is fastened to the blade 9 of the road machine shown generally at A. Thus the long blade can be raised and lowered and can be swung forwardly and rearwardly on the hinge. A boom a is carried by the road machine and a pulley 10 is supported at the outer end of the boom over which passes a cable 11 which has one end connected to a clevis 12 pivoted to an intermediate part of the blade 1 and its other end passes around the drum 13 which is driven in any suitable manner from a small motor M located on the road machine and provided with suitable control means which can be actuated by an operator standing on the road machine.

A cable 14 has its ends connected to the eye bolts 15 spaced longitudinally on the blade 1 and this cable 14 is connected to the block and tackle 16 which is suitably actuated from the power take off shaft of the tractor T and is controlled by a lever 17 which can be manipulated by the operator of the tractor.

From the foregoing it will be seen that the long blade can be raised and lowered as desired and it can be moved forwardly. It can be permitted to swing rearwardly by simply slackening the tackle. By manipulating the blade by the tackle it can be adjusted to suit the width of the slope but when it is pulled forwardly, as shown in Figure 1 it will operate on a comparatively narrow slope and when permitted to swing rearwardly it will operate on a wider slope. By raising and lowering the blade through means of the motor M the angle of the slope can be regulated.

Thus it will be seen that with this attachment the slope can be formed without the road machine or the tractor leaving the road surface, which would be impossible in lots of cases and in other cases would be undesirable as the wheels would leave marks in the slope and there would always be danger of the vehicle being stalled in the soft material of the slope.

Figures 4 and 5 show the invention applied to a tractor T and in this case a supporting bar 20 is pivoted to a bracket 21 attached to a side part of the tractor. The blade 1' is connected to the outer end of the bar 20 by the hinge and pivot shown generally at 6', these parts being the same as shown in Figure 3. A rod 22 has its lower end pivotally connected to the bar 20 and its other end is threaded and passes through a threaded bore in the hub of a hand wheel 23 which is rotatably supported in a bracket 24 carried by the tractor. Thus by turning the wheel the bar 20 can be raised or lowered.

The blade 1' can be swung on its hinge through means of the cable 25 connected to the cable 26 which is connected with the blade, the cable passing over a pulley 27 on a forwardly extending boom 28 on the tractor, the cable 25 then extending rearwardly and passing over a pulley 29 on a rear part of the tractor and then the cable is connected to a control part operated by a power take off shaft of the tractor. The blade can be raised and lowered by means of the cable 30 connected with the blade and passing over a pulley 31 on an outwardly extending bar 32 on the tractor and then the cable passes over a pulley 33 at the rear of the tractor to a control also driven by a take off shaft of the tractor, the controls being shown generally at 34 and these controls may be of any suitable type so that the cables can be taken up or played out as desired.

As will be seen in this case the invention is connected directly to the tractor and can be used where it is not necessary to use a regular road machine.

It is thought from the foregoing description that the advantages and novel features of the invention will be readily apparent.

It is to be understood that changes may be made in the construction and in the combination and arrangement of the several parts, provided that such changes fall within the scope of the appended claim.

Having described the invention what is claimed as new is:

In combination with a road grader and a tractor for pulling the same, a plate connected with one end of the blade of the grader, a hinge including a pair of leaves pivotally connected together with the pivot vertically arranged, means for pivoting one leaf to the plate with the pivot horizontally arranged, a long blade having one end fastened to the other leaf of the hinge, a boom on the grader, a cable connected with an intermediate part of the long blade, guide means on the boom for the cable, a power driven drum on the grader to which the cable is connected, said drum and cable acting to raise and lower the long blade on the pivot which connects the plate with a hinge leaf, a power driven means on the tractor, a flexible member connecting said means with the long blade for moving the long blade on the hinge toward the tractor when the flexible means are shortened by the power means on the tractor and for permitting the long blade to move away from the tractor when the flexible means are lengthened.

JAMES P. BURNS.